US008733629B2

(12) United States Patent
Morito et al.

(10) Patent No.: US 8,733,629 B2
(45) Date of Patent: May 27, 2014

(54) READING APPARATUS, NON-TRANSITORY COMPUTER READABLE MEDIUM, AND IMAGE PROCESSING METHOD

(71) Applicant: Fuji Xerox Co., Ltd., Tokyo (JP)

(72) Inventors: Kazuaki Morito, Kanagawa (JP); Yuki Tsuchitoi, Kanagawa (JP); Manabu Hayashi, Kanagawa (JP); Naoya Nobutani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/765,370

(22) Filed: Feb. 12, 2013

(65) Prior Publication Data
US 2014/0042219 A1 Feb. 13, 2014

(30) Foreign Application Priority Data
Aug. 8, 2012 (JP) ................................. 2012-176187

(51) Int. Cl.
*G06F 17/00* (2006.01)
(52) U.S. Cl.
USPC .................. 235/375; 235/462.45; 235/472.01
(58) Field of Classification Search
USPC .......... 235/375, 462.45, 472.01; 345/179, 156
See application file for complete search history.

(56) References Cited

U.S. PATENT DOCUMENTS

| | | | | |
|---|---|---|---|---|
| 6,081,261 A | * | 6/2000 | Wolff et al. | 345/179 |
| 8,275,222 B2 | * | 9/2012 | Hotta et al. | 382/313 |
| 2005/0184159 A1 | * | 8/2005 | Hattori et al. | 235/462.45 |
| 2009/0253107 A1 | * | 10/2009 | Marggraff | 434/162 |
| 2010/0283766 A1 | * | 11/2010 | Shieh | 345/179 |

FOREIGN PATENT DOCUMENTS

JP    2003-107979 A    4/2003

* cited by examiner

*Primary Examiner* — Edwyn Labaze
(74) *Attorney, Agent, or Firm* — Sughrue Mion, PLLC

(57) ABSTRACT

A reading apparatus includes a writing tool body, a reading unit, and a processing unit. The reading unit is included in the writing tool body and reads a code formed on a medium. The processing unit acquires, from the code read by the reading unit, coordinate information regarding coordinates on the medium and processing specifying information which specifies processing to be performed on acquired information. The processing unit also performs predetermined processing specified by the processing specifying information on the acquired information. The acquired information is information acquirable by the reading apparatus and includes the coordinate information. The transfer unit transfers a processing result obtained by the processing unit to a predetermined transfer destination.

7 Claims, 22 Drawing Sheets

FIG. 10

| REGION TYPE | INFORMATION TYPE | | |
|---|---|---|---|
| | TYPE OF INFORMATION TO BE STORED | ACTION TYPE | |
| CHECK | COORDINATES | DEFAULT | TRANSFER DESTINATION 1 |
| CHARACTER | COORDINATES, TIME | OCR | TRANSFER DESTINATION 1 |
| DIAGRAM | COORDINATES | DEFAULT | TRANSFER DESTINATION 1 |
| NUMERAL | COORDINATES, TIME | OCR | TRANSFER DESTINATION 1 |
| SIGNATURE | COORDINATES, TIME, WRITING PRESSURE, PEN ID | AUTHENTICATION | TRANSFER DESTINATION 1 |

FIG. 11

| REGION TYPE | INFORMATION TYPE | | | |
|---|---|---|---|---|
| | TYPE OF INFORMATION TO BE STORED | ACTION TYPE | TRANSFER DESTINATION | REGION RANGE |
| CHECK (1) | COORDINATES | DEFAULT | TRANSFER DESTINATION 1 | (5000, 5000, 5200, 5200) |
| CHECK (2) | COORDINATES | DEFAULT | TRANSFER DESTINATION 1 | (7000, 5000, 7200, 5200) |
| CHARACTER | COORDINATES, TIME | OCR | TRANSFER DESTINATION 1 | (5000, 6000, 9000, 6800) |
| DIAGRAM | COORDINATES | DEFAULT | TRANSFER DESTINATION 1 | (5000, 7000, 9000, 9600) |
| NUMERAL | COORDINATES, TIME | OCR | TRANSFER DESTINATION 1 | (5000, 10000, 9000, 10800) |
| SIGNATURE | COORDINATES, TIME, WRITING PRESSURE, PEN ID | AUTHENTICATION | TRANSFER DESTINATION 1 | (5000, 11000, 9000, 11800) |

FIG. 14

| PAGE NUMBER | RECTANGLE STARTING COORDINATES | RECTANGLE ENDING COORDINATES | INFORMATION TYPE | | |
|---|---|---|---|---|---|
| | | | TYPE OF INFORMATION TO BE STORED | ACTION TYPE | TRANSFER DESTINATION |
| 1 | (1000, 1000) | (2000, 1500) | COORDINATES, TIME | AUTHENTICATION | TRANSFER DESTINATION 1 |
| 1 | (0, 2000) | (8000, 8000) | COORDINATES, TIME | OCR | TRANSFER DESTINATION 1 |
| 3 | (0, 0) | (6000, 6000) | COORDINATES | DEFAULT | TRANSFER DESTINATION 1 |
| 4 | (100, 100) | (400, 140) | COORDINATES, WRITING PRESSURE | AUTHENTICATION | TRANSFER DESTINATION 1 |

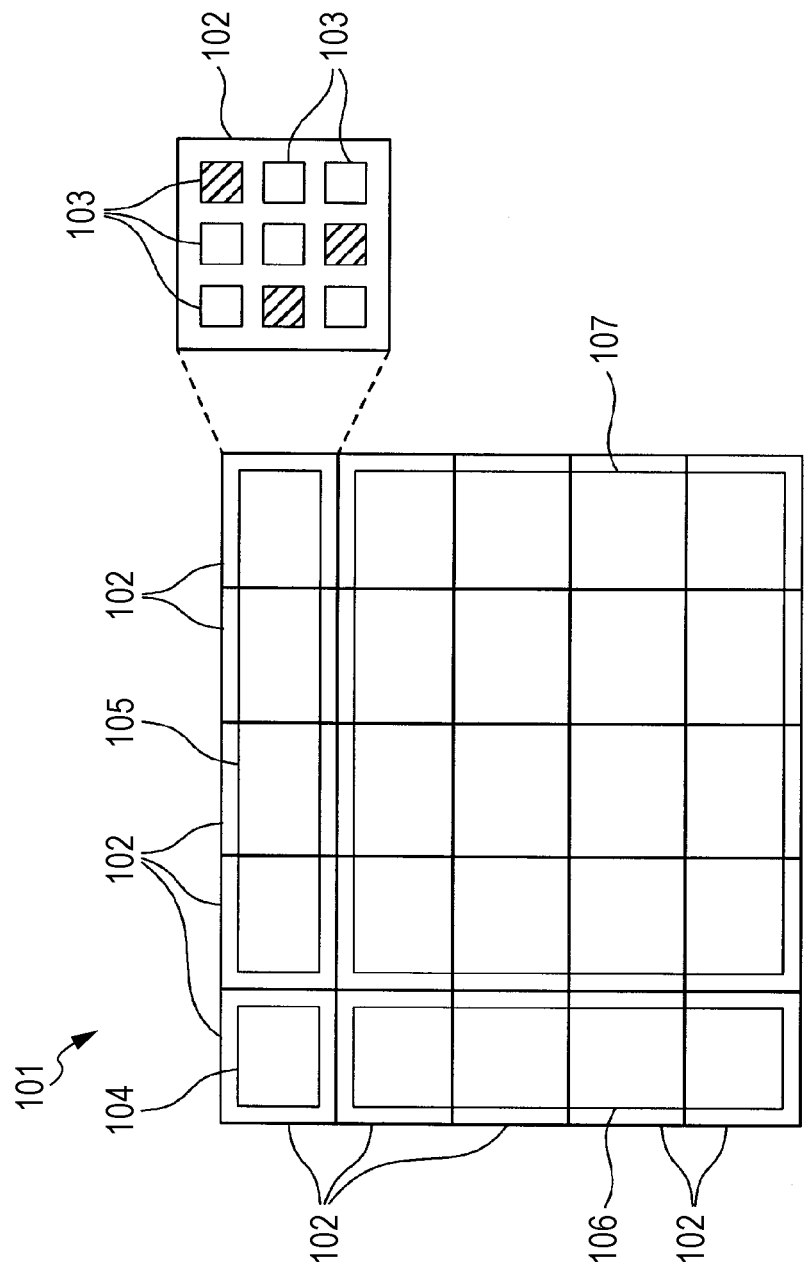

FIG. 16

| SHEET ID | WRITING PRESSURE | TIME | COORDINATE INFORMATION | PEN ID | RESERVED | ACTION TYPE | TRANSFER DESTINATION |
|---|---|---|---|---|---|---|---|
| 00000000000000000000000000000000000000110000000000000000 | 1 | 1 | 0 | 0 | 00 | 001 | 01 |
| 50 BITS | EXTENDED 1 BIT | EXTENDED 1 BIT | EXTENDED 1 BIT | EXTENDED 1 BIT | EXTENDED 2 BITS | EXTENDED 3 BITS | EXTENDED 2 BITS |

FIG. 18

Q1. HOW MANY HOURS DO YOU STUDY PER DAY?

15 HOURS

Q2. DO YOU HAVE LATE-NIGHT SNACK?
☑ YES   ☐ NO

Q3. HOW MANY HOURS DO YOU SLEEP ON AVERAGE?

2 HOURS

Q1. HOW MANY HOURS DO YOU STUDY PER DAY?

202

Q2. DO YOU HAVE LATE-NIGHT SNACK?
203 — ☐ YES   ☐ NO
~201
~204

Q3. HOW MANY HOURS DO YOU SLEEP ON AVERAGE?

| REGION TYPE | INFORMATION TYPE | | | REGION RANGE |
|---|---|---|---|---|
| | TYPE OF INFORMATION TO BE STORED | ACTION TYPE | TRANSFER DESTINATION | |
| CHARACTER | COORDINATES, TIME | OCR | TRANSFER DESTINATION 2 | (5000, 6000, 9000, 6800) |
| CHECK (1) | COORDINATES | DEFAULT | TRANSFER DESTINATION 3 | (5000, 8000, 5200, 5200) |
| CHECK (2) | COORDINATES | DEFAULT | TRANSFER DESTINATION 3 | (7000, 8000, 7200, 5200) |
| CHARACTER | COORDINATES, TIME | OCR | TRANSFER DESTINATION 2 | (5000, 10000, 9000, 10800) |

FIG. 21

FINAL TEST

TEST 1 : ☑ OK   ☐ NG
TEST 2 : ☑ OK   ☐ NG
TEST 3 : ☑ OK   ☐ NG
TEST 4 : ☑ OK   ☐ NG

APPROVED BY

*Mark*

FINAL TEST

TEST 1 : ☐ OK   ☐ NG
TEST 2 : ☐ OK   ☐ NG
TEST 3 : ☐ OK   ☐ NG
TEST 4 : ☐ OK   ☐ NG

APPROVED BY

211 — (FINAL TEST)
212 — (NG column, row 1)
213 — (TEST 1 OK)
214 — (NG row 2)
215 — (TEST 2 OK)
216 — (NG row 3)
217 — (TEST 3 OK)
218 — (NG row 4)
219 — (APPROVED BY box)
221 — (page)

FIG. 23

| REGION TYPE | INFORMATION TYPE | | |
|---|---|---|---|
| | TYPE OF INFORMATION TO BE STORED | ACTION TYPE | TRANSFER DESTINATION |
| CHECK (1) TO (8) | COORDINATES | DEFAULT | TRANSFER DESTINATION 3 |
| CHARACTER | COORDINATES, WRITING PRESSURE | AUTHENTICATION | TRANSFER DESTINATION 2 |

| REGION RANGE |
|---|
| (1000, 500, 1200, 700) TO (2000, 2500, 2200, 2700) |
| (5000, 3500, 2500, 4000) |

FIG. 24

| REGION TYPE | INFORMATION TYPE | | |
|---|---|---|---|
| | TYPE OF INFORMATION TO BE STORED (PROCESSED/ SET INFORMATION) | ACTION TYPE | TRANSFER DESTINATION |
| CHECK (1) TO (8) | COORDINATES | DEFAULT | TRANSFER DESTINATION 3 |
| CHARACTER | STROKE INFORMATION 4 | AUTHENTICATION | TRANSFER DESTINATION 2 |

| REGION RANGE |
|---|
| (1000, 500, 1200, 700) TO (2000, 2500, 2200, 2700) |
| (5000, 3500, 2500, 4000) |

FIG. 25

| REGION TYPE | INFORMATION TYPE | | | |
|---|---|---|---|---|
| | TYPE OF INFORMATION TO BE STORED (PROCESSED/SET INFORMATION) | ACTION TYPE | TRANSFER DESTINATION | REGION RANGE |
| CHECK (1) TO (8) | STROKE INFORMATION 1 | DEFAULT | TRANSFER DESTINATION 3 | (1000, 500, 1200, 700) TO (2000, 2500, 2200, 2700) |
| CHARACTER | COORDINATES, WRITING PRESSURE | AUTHENTICATION | TRANSFER DESTINATION 2 | (5000, 3500, 2500, 4000) |

READING APPARATUS, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2012-176187 filed Aug. 8, 2012.

BACKGROUND

Technical Field

The present invention relates to a reading apparatus, a non-transitory computer readable medium, and an image processing method.

SUMMARY

According to an aspect of the invention, there is provided a reading apparatus including a writing tool body, a reading unit, and a processing unit. The reading unit is included in the writing tool body and reads a code formed on a medium. The processing unit acquires, from the code read by the reading unit, coordinate information regarding coordinates on the medium and processing specifying information which specifies processing to be performed on acquired information. The processing unit also performs predetermined processing specified by the processing specifying information on the acquired information. The acquired information is information acquirable by the reading apparatus and includes the coordinate information. The transfer unit transfers a processing result obtained by the processing unit to a predetermined transfer destination.

BRIEF DESCRIPTION OF THE DRAWINGS

An exemplary embodiment of the present invention will be described in detail based on the following figures, wherein:

FIG. 10 illustrates a table used by the host computer of the image processing system according to the exemplary embodiment of the present invention;

FIG. 11 illustrates an information type that is set for each region range illustrated in the example illustrated in FIGS. 8 and 9 based on the example table illustrated in FIG. 10 in the image processing system according to the exemplary embodiment of the present invention;

FIG. 14 specifically describes a two-dimensional code image generation process performed in the image processing system according to the exemplary embodiment of the present invention;

FIG. 15 illustrates a structure of a two-dimensional code image generated by the image forming apparatus of the image processing system according to the exemplary embodiment of the present invention;

FIG. 16 illustrates a structure of data that is encoded in a two-dimensional code image generated by the image forming apparatus of the image processing system according to the exemplary embodiment of the present invention;

FIG. 18 describes a specific example of the digital pen process performed by the digital pen of the image processing system according to the exemplary embodiment of the present invention;

FIG. 19 describes the specific example of the digital pen process performed by the digital pen of the image processing system according to the exemplary embodiment of the present invention;

FIG. 20 describes the specific example of the digital pen process performed by the digital pen of the image processing system according to the exemplary embodiment of the present invention;

FIG. 21 describes another specific example of the digital pen process performed by the digital pen of the image processing system according to the exemplary embodiment of the present invention;

FIG. 22 describes the other specific example of the digital pen process performed by the digital pen of the image processing system according to the exemplary embodiment of the present invention;

FIG. 23 describes the other specific example of the digital pen process performed by the digital pen of the image processing system according to the exemplary embodiment of the present invention;

FIG. 24 describes the other specific example of the digital pen process performed by the digital pen of the image processing system according to the exemplary embodiment of the present invention;

FIG. 25 describes the other specific example of the digital pen process performed by the digital pen of the image processing system according to the exemplary embodiment of the present invention;

DETAILED DESCRIPTION

An exemplary embodiment of the present invention will be described below.

Figure 1:
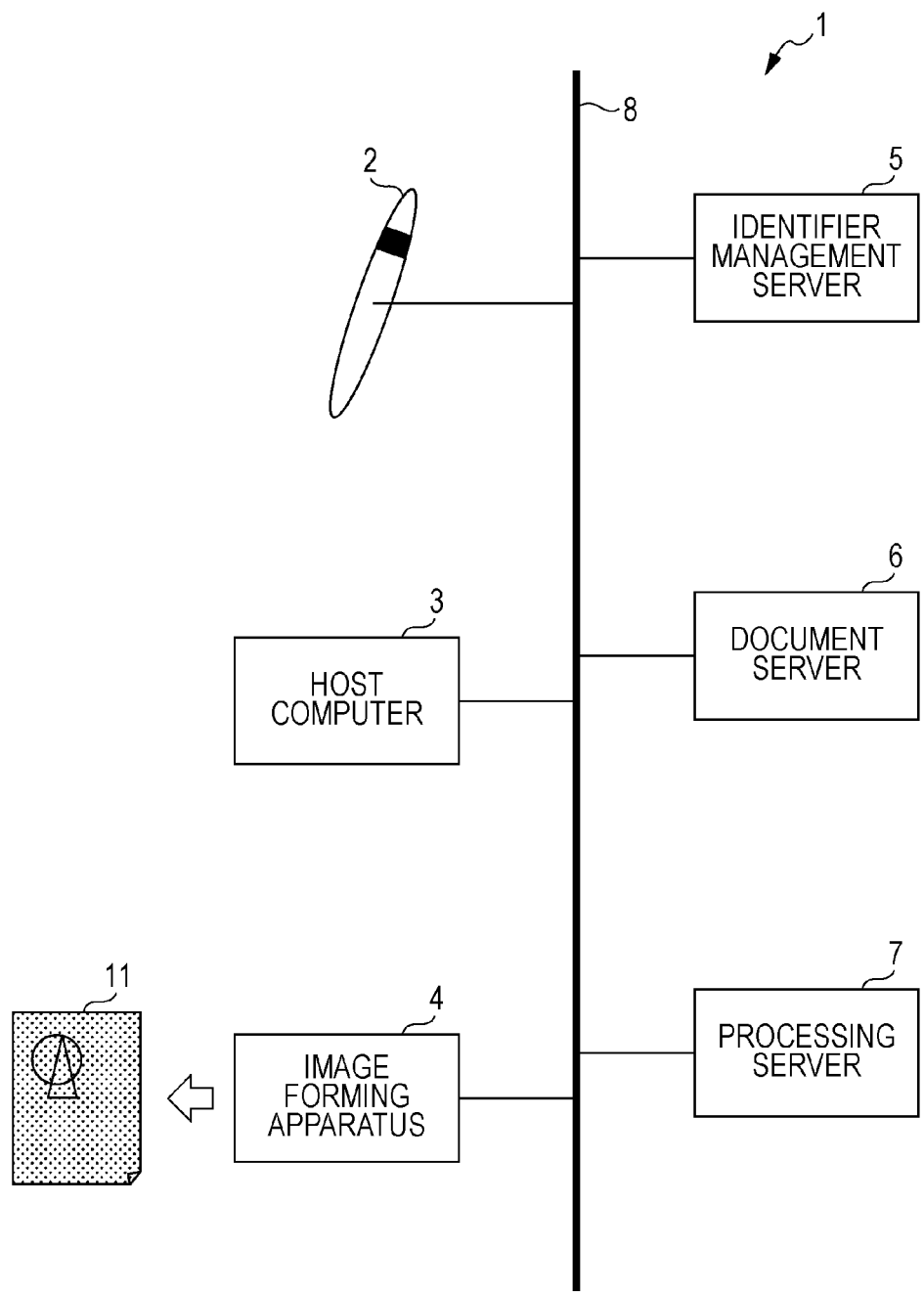
FIG. 1 illustrates a schematic configuration of an image processing system according to an exemplary embodiment of the present invention.

FIG. 1 illustrates a schematic configuration of an image processing system 1 according to an exemplary embodiment of the present invention. This image processing system 1 includes a digital pen 2 serving as a reading apparatus, a host computer 3, an image forming apparatus 4, an identifier management server 5, a document server 6, and a processing server 7, which are connected to each other via a communication network 8, such as a local area network (LAN) or the Internet.

The identifier management server 5 is a server apparatus that manages identifiers used in the image processing system 1. Examples of the identifiers managed by the identifier management server 5 include document IDs assigned to identify individual pieces of document data.

The document server 6 is a server apparatus that manages pieces of document data. Specifically, the document server 6 stores document data received from the host computer 3 in association with a document ID of the document data.

The processing server 7 is a server apparatus that performs predetermined processing on information transmitted from the digital pen 2 or the like.

Figure 2:
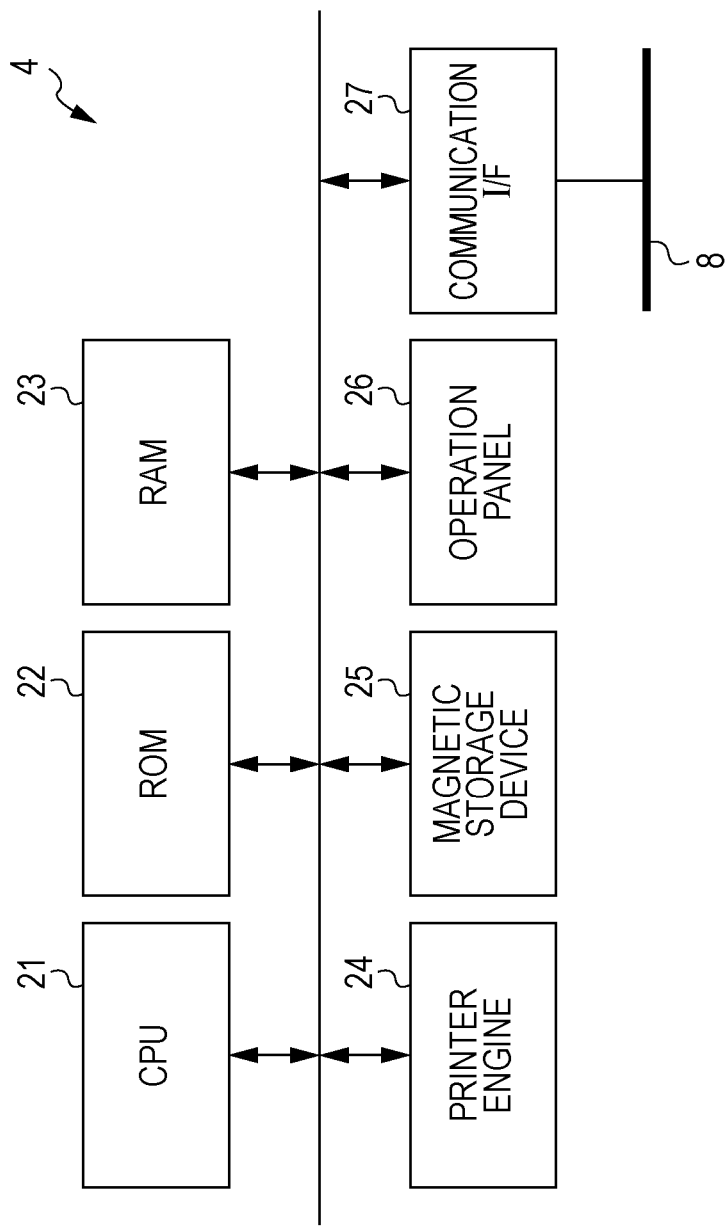
FIG. 2 is a block diagram illustrating electrical connections in an image forming apparatus of the image processing system according to the exemplary embodiment of the present invention.

A configuration of the image forming apparatus 4 will be described next. FIG. 2 is a block diagram illustrating electrical connections in the image forming apparatus 4. The image forming apparatus 4 includes a central processing unit (CPU) 21, a read only memory (ROM) 22, and a random access memory (RAM) 23, which are connected to each other. The CPU 21 performs various computations and controls individual components centrally. The ROM 22 stores various control programs executed by the CPU 21 and fixed data. The RAM 23 serves as a work area of the CPU 21. The CPU 21 is also connected to a printer engine 24, a magnetic storage device 25, an operation panel 26, and a communication interface (I/F) 27. The printer engine 24 forms an image on a medium 11, such as a sheet. The magnetic storage device 25 stores document data or the like. The operation panel 26 is used to perform various operations on the image forming apparatus 4. The communication I/F 27 communicates with the communication network 8. The printer engine 24 uses the electrophotographic system to form an image in this example but the printer engine 24 may use another system, such as the inkjet system.

Figure 3:
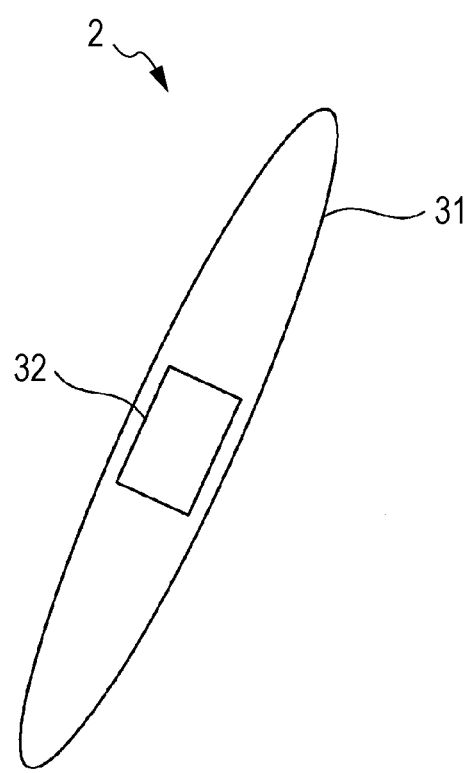
FIG. 3 illustrates a schematic configuration of a digital pen of the image processing system according to the exemplary embodiment of the present invention.

A configuration of the digital pen 2 will be described next. FIG. 3 illustrates a schematic configuration of the digital pen 2. The digital pen 2 includes a writing tool body 31 for writing on the medium 11. The writing tool body 31 includes a processor 32.

Figure 4:
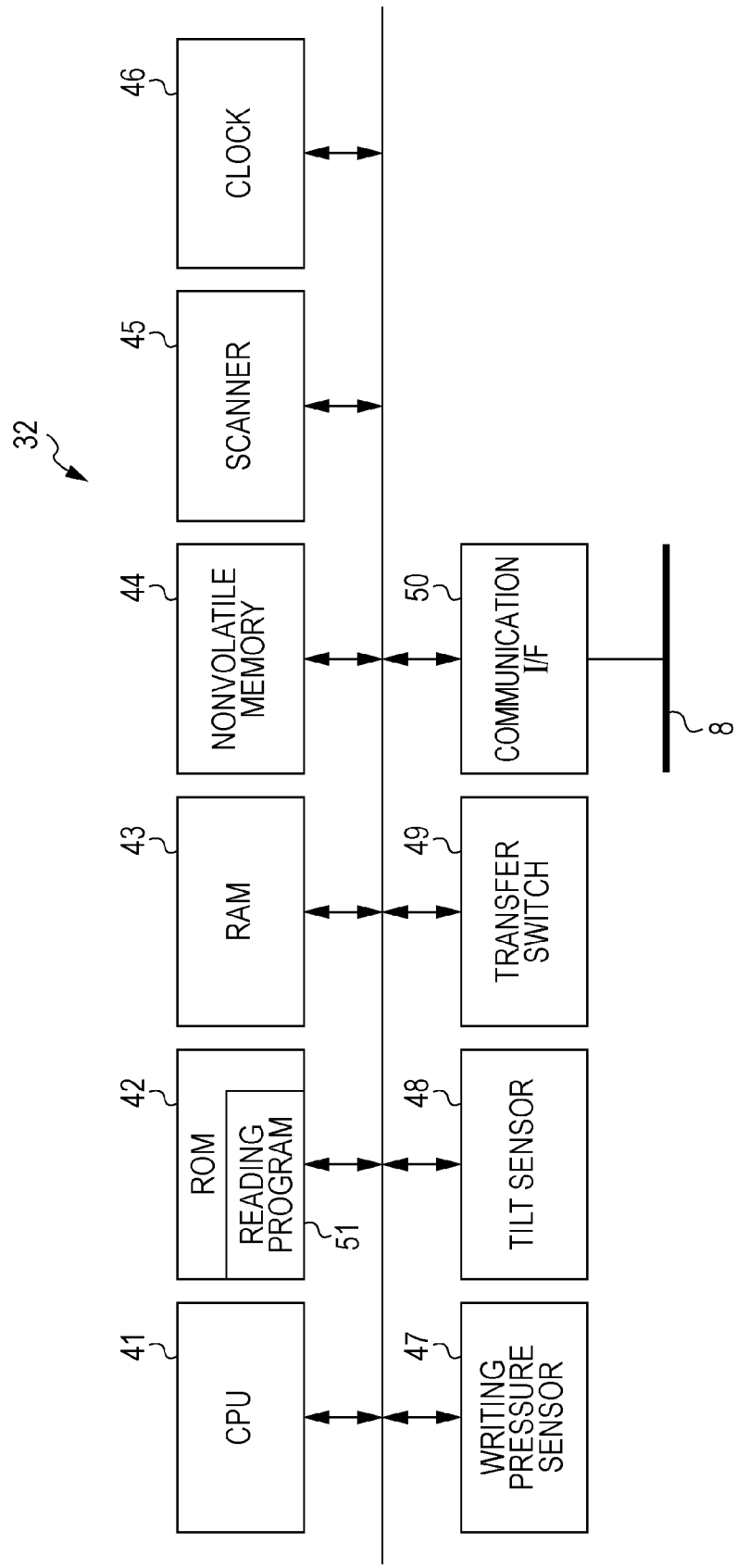
FIG. 4 is a block diagram illustrating electrical connections in the digital pen of the image processing system according to the exemplary embodiment of the present invention.

FIG. 4 is a block diagram illustrating electrical connections in the processor 32 of the digital pen 2. The processor 32 includes a CPU 41, a ROM 42, a RAM 43, and a nonvolatile memory 44, which are connected to each other. The CPU 41 performs various computations and controls individual components centrally. The ROM 42 stores various control programs executed by the CPU 41 and fixed data. The RAM 43 serves as a work area of the CPU 41. The CPU 41 is also connected to a scanner 45, a clock 46, a writing pressure sensor 47, a tilt sensor 48, a transfer switch 49, and a communication I/F 50. The scanner 45 reads two-dimensional code images (which will be described in detail later), which are images of a two-dimensional code formed by the image forming apparatus 4 on the medium 11. The writing pressure sensor 47 detects a writing pressure applied to the writing tool body 31. The tilt sensor 48 detects a tilt of the writing tool body 31. The communication I/F 50 communicates with the communication network 8. The ROM 42 also stores a reading program 51 that is a control program executed in the digital pen 2.

Figure 5:
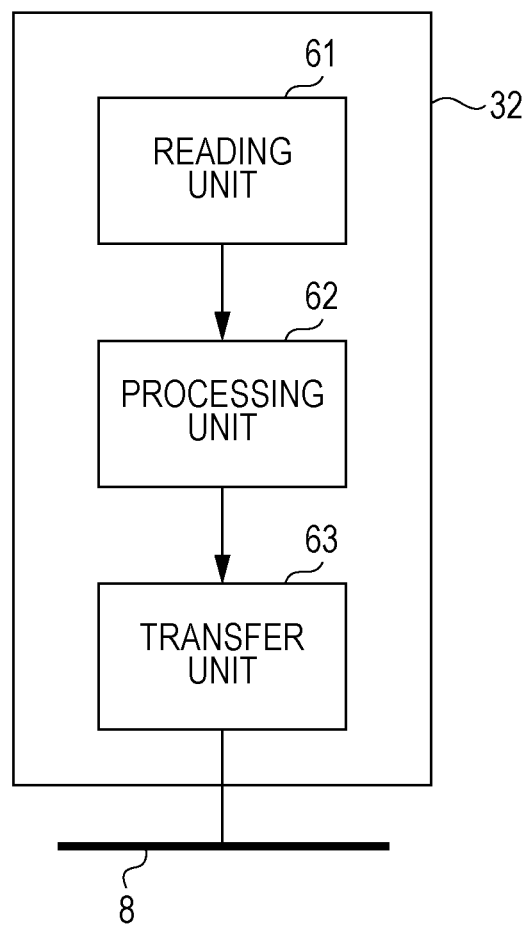
FIG. 5 is a functional block diagram of the digital pen of the image processing system according to the exemplary embodiment of the present invention.

FIG. 5 is a functional block diagram of processes executed by the processor 32 of the digital pen 2. A reading unit 61 executes a function of reading two-dimensional code images formed on the medium 11 by using the scanner 45, thereby implementing a reading unit. A processing unit 62 acquires information from the two-dimensional code images read by the reading unit 61. Kinds of the information acquired at this time include coordinate information that represents the coordinates on the medium 11, a type of information to be stored (selection specifying information), an action type (processing specifying information), and a transfer destination (transfer destination specifying information). Based on the type of information to be stored, the processing unit 62 selects one or more kinds of information (acquired information) acquirable in the processor 32 of the digital pen 2. Based on the action type, the processing unit 62 then processes the selected one or more kinds of information (which will be described in detail later). The processing unit 62 implements a processing unit. A transfer unit 63 transfers information resulting from the processing performed by the processing unit 62 based on the action type, to a predetermined transfer destination via the communication I/F 50.

Figure 6:
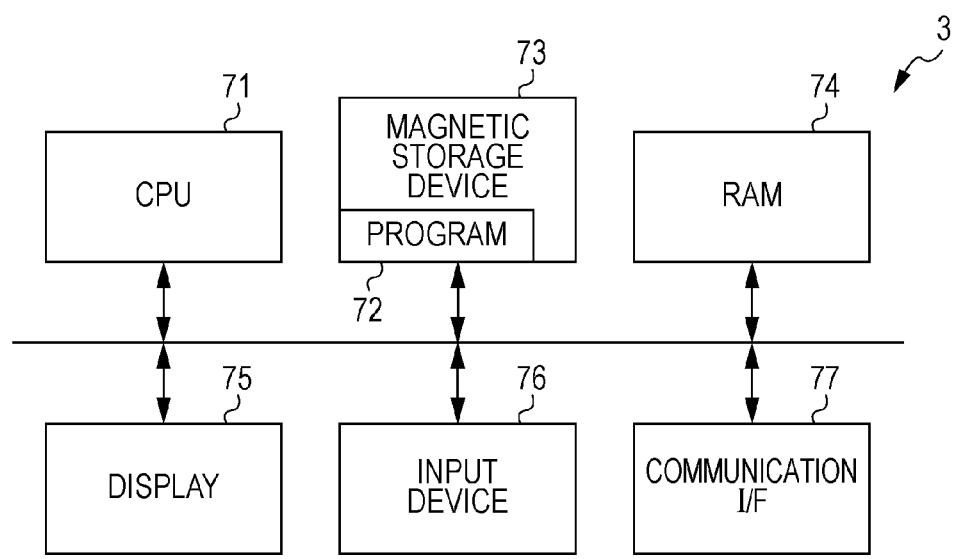
FIG. 6 is a block diagram illustrating electrical connections in a host computer of the image processing system according to the exemplary embodiment of the present invention.

FIG. 6 is a block diagram illustrating electrical connections in the host computer 3. The host computer 3 is an apparatus that requests the image forming apparatus 4 to form, on the medium 11 such as a sheet, an image represented by document data or diagram data that is created or input by the user. The host computer 3 also stores and processes information received from the digital pen 2.

The host computer 3 includes a CPU 71 that performs various computations and controls individual components centrally. The CPU 71 is connected to a magnetic storage device 73 that stores a program 72 executed by the CPU 71 and various kinds of data, such as fixed data; a RAM 74 that serves as a work area of the CPU 71; a display 75; an input device 76, such as a keyboard or a mouse; and a communication I/F 77 that communicates with the communication network 8.

Details about processes performed in the image processing system 1 will be described next.

The user performs a writing operation on the medium 11 by using the digital pen 2. Then, the digital pen 2 reads two-dimensional code images formed on the medium 11 by using the scanner 45, thereby acquiring coordinate information that represents the coordinates on the medium 11. Consequently, data of a handwriting trajectory of the digital pen 2, which is represented by consecutive pieces of coordinate information, is obtained as handwriting data. From this handwriting data, characters or the like written by the user on the medium 11 are identified.

Typically, this handwriting data is temporarily stored in the RAM 43 or the nonvolatile memory 44 of the digital pen 2 and is then transmitted to the host computer 3. The host computer 3 typically stores the received information and performs predetermined processing, i.e., optical character recognition (OCR) processing or image processing, on the received information.

The digital pen 2 acquires many pieces of information, such as the time of writing, the writing pressure, and the tilt of the digital pen 2 by using the clock 46, the writing pressure sensor 47, and the tilt sensor 48, respectively, in addition to the coordinate information on the medium 11. These pieces of information are increasingly used as auxiliary information in the OCR processing or the image processing performed in the host computer 3. As the amount of information acquired by the digital pen 2 increases, the amount of data stored in the digital pen 2 increases. As a result, the amount of data to be transferred to the host computer 3 or the like also increases.

To avoid such an increase in the amount of data, part of processing originally performed in the host computer 3 may be performed in the digital pen 2 and the processing result alone may be transmitted to the host computer 3. However, the digital pen 2 has no knowledge about processing desirably performed therein. Also, the digital pen 2 has no knowledge about pieces of information to be transmitted to the host computer 3 and pieces of information to be processed in the digital pen 2 among the acquired pieces of information. For this reason, the digital pen 2 transmits all the acquired data to the host computer 3 or the like, which undesirably increases a period taken for transferring the data.

In an example described in Japanese Unexamined Patent Application Publication No. 2003-107979, a system is disclosed in which a pen transfers coordinate data that is handwriting data to a server, and a host computer controls processing based on predetermined attribute information that corresponds to the coordinate data. However, in this system, the pen is not allowed to control the processing and thus is unable to process the acquired information in accordance with the processing. Consequently, the pen transfers all the acquired data to the server without processing the acquired data.

Details about processes performed in the image processing system 1 will be described below with regard to how the above-described inconvenience is addressed.

First, a form generation process performed by the host computer 3 will be described. The form generation process is a process of generating a form document that is document data used by the image forming apparatus 4 to form an image. This form document is document data used to form an image containing two-dimensional code images on the medium 11.

Figure 7:
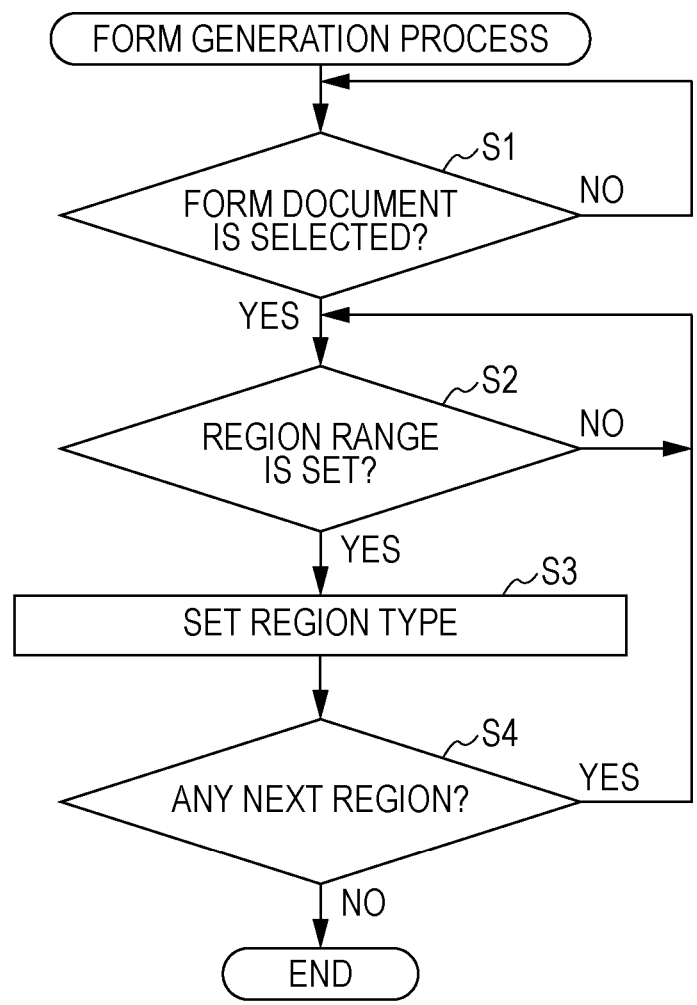
FIG. 7 is a flowchart of a form generation process performed by the host computer of the image processing system according to the exemplary embodiment of the present invention.
Figure 8:
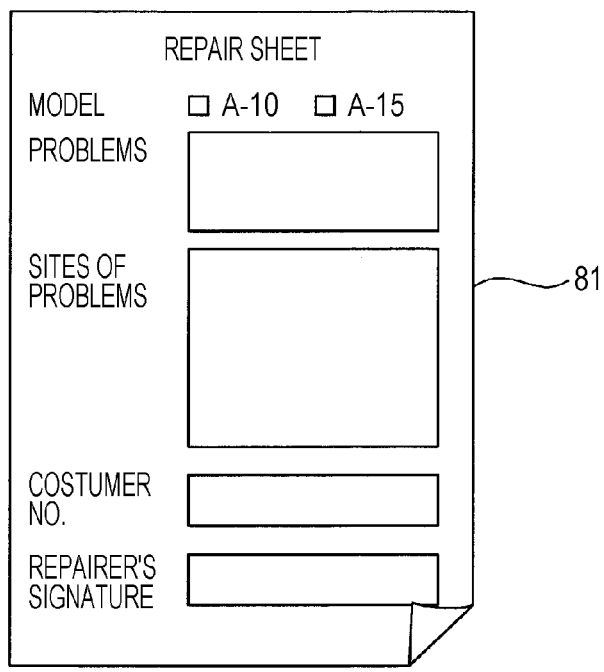
FIG. 8 illustrates a form document used in the image processing system according to the exemplary embodiment of the present invention.
Figure 9:
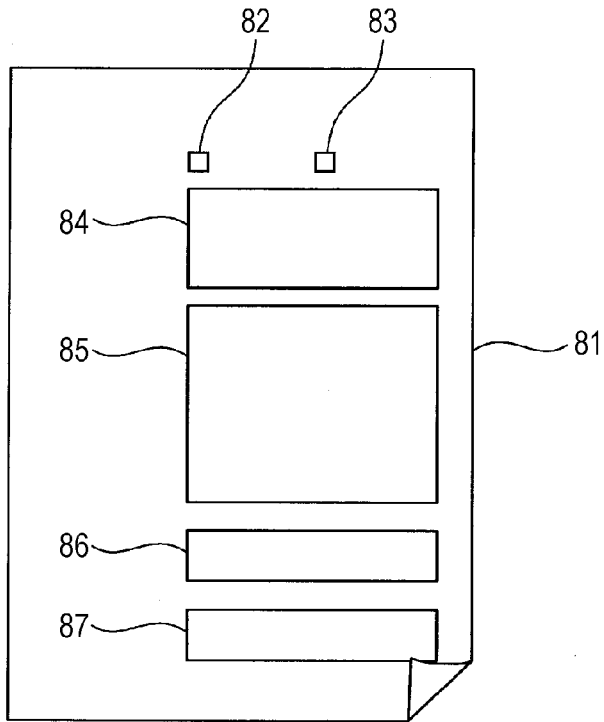
FIG. 9 illustrates the form document used in the image processing system according to the exemplary embodiment of the present invention.

FIG. 7 is a flowchart of the form generation process. FIGS. 8 and 9 illustrate a form document. The form generation process is performed based on application software included in the program 72. First, the user selects a form document (YES in step S1). Here, the form document is document data of a document, such as a document 81 illustrated in FIG. 8. Then, a region range is set on the form document (YES in step S2) and a region type is set (step S3). If a region for which a region range is to be set next no longer exists (NO in step S4), the process ends.

In this example, as illustrated in FIG. 9, region ranges 82 to 87 are set on the document 81 and region types are set for the individual region ranges 82 to 87. The region types represent types of the region ranges set on the document 81. In this example, there are five region types: "check", "character", "diagram", "numeral", and "signature". In this example, the region type "check" is set for the region ranges 82 and 83 (check (1) and check (2), respectively). The region type "character" is set for the region range 84. The region type "diagram" is set for the region range 85. The region type "numeral" is set for the region range 86. The region type "signature" is set for the region range 87.

After the region type is set (step S3), an information type corresponding to the region type is set for each of the region ranges 82 to 87 set on the document 81. A correspondence between the information type and the region type is set in the host computer 3 as illustrated by a table 91 illustrated in FIG. 10. There are three information types: a type of information to be stored, an action type, and a transfer destination. The "type of information to be stored" specifies information to be stored from among pieces of information acquired by the digital pen 2. Multiple types may be set as the type of information to be stored. Examples of the type of information to be stored include coordinates, time, writing pressure, and the pen ID. The "coordinates" indicate coordinate information that represents the coordinates on the medium 11 that are obtained by reading the two-dimensional code from the medium 11. The "time" indicates information regarding the time at which a handwriting trajectory is drawn with the digital pen 2 and is obtained by the clock 46 of the digital pen 2. The "writing pressure" indicates information regarding a writing pressure applied to the digital pen 2 and is detected by the writing pressure sensor 47 of the digital pen 2. The "pen ID" is a unique ID of the digital pen 2. The "action type" is information that specifies processing to be performed in the digital pen 2 on information stored based on the type of information to be stored, among pieces of information acquired by the digital pen 2. Examples of the action type include "default", "OCR", and "authentication". The "default" specifies that information is not to be processed. The "OCR" specifies that character recognition processing is to be performed on the user's handwriting trajectory determined from the coordinate information described above. The "authentication" specifies that authentication is to be performed on the user's signature determined from the coordinate information described above. The "transfer destination" is information that specifies a destination to which information that has been or has not been processed based on the action type is to be transferred. Examples of the transfer destination include a transfer destination 1 and a transfer destination 2. As a specific transfer destination, the host computer 3, the processing server 7, or the like is set.

As a result of setting the region range on the form document (YES in step S2) and setting the region type (step S3) in this way, the information type, namely, the type of information to be stored, the action type, and the transfer destination, corresponding to the selected region type is set for each of the region ranges 82 to 87 set on the document 81.

FIG. 11 illustrates a table in which the information type is set for the individual region ranges 82 to 87 based on the example table 91 illustrated in FIG. 10 regarding the example form document 81 illustrated in FIGS. 8 and 9. In this table, the region types "check (1)" and "check (2)" respectively represent the region ranges 82 and 83, the region type "character" represents the region range 84, the region type "diagram" represents the region range 85, the region type "numeral" represents the region range 86, and the region type "signature" represents the region range 87. The table also includes coordinates of each region range in association with the region range. Because each region range is a rectangle in this example, the region range is represented by the X and Y coordinates of the upper left corner and the lower right corner of the rectangle.

In another example, a processed information set obtained by processing the pieces of information acquired by the digital pen 2 or a set of the coordinate information and the writing pressure acquired by the writing pressure sensor 47 or the like may be used as the "information type" described above. Examples of the processed information set may include stroke information 1, stroke information 2, stroke information 3, and stroke information 4. Here, the term "stroke" indicates a line represented by consecutive coordinates at which the writing pressure detected by the writing pressure sensor 47 is greater than zero, that is, a line written with one stroke. The stroke information 1 is information constituted by pieces of coordinate information of the starting and ending points of writing. The stroke information 2 is information constituted by pieces of coordinate information of all points from the starting point to the ending point of writing and pieces of time information for the starting and ending points. The stroke information 3 is information constituted by pieces of coordinate information and pieces of time information for all points from the starting point to the ending point of writing. The stroke information 4 is information constituted by the stroke information 3, pieces of information regarding the tilt of the digital pen 2 detected by the tilt sensor 48 at the individual coordinates, and pieces of information regarding the writing pressure detected by the writing pressure sensor 47 at the individual coordinates. The stroke information 1 may be set for a check box field that does not require reproducibility. The stroke information 2 or the stroke information 3 may be set when handwriting trajectory information is supplied to the character recognition processing. The stroke information 4 may be set when a diagram that requires the highest reproducibility is drawn. By defining the stroke information 1 to the stroke information 4 and by using the individual pieces of stroke information 1 to 4 as the information type for different cases, necessary information may be selected.

In this case, "processed/set information" is specifiable as the type of information to be stored. Specifically, when the type of information to be stored is not the "processed/set information", (1) information acquired by the digital pen 2 is stored without being processed and (2) processing is performed based on the action type. On the other hand, when the type of information to be stored is the "processed/set information", (1) the acquired information is processed based on an actual value of the processed/set information (one of the stroke information 1 to the stroke information 4) (in the case where the type of information to be stored is merely a set of multiple information types, values are stored in the digital pen 2 based on each type of information to be stored without being processed); (2) the processed information is then stored in the digital pen 2; and (3) processing is performed based on the action type.

Next, an instruction for printing an image containing a two-dimensional code by using a form document will be described. If the user gives a print instruction for printing an image containing a two-dimensional code by using a form document from the host computer 3, the image forming apparatus 4 forms an image based on the form document in response to this print instruction. In this case, an image of the form document 81 illustrated in FIG. 8 is formed on the medium 11 and also two-dimensional code images are continuously formed in a portion of the medium 11. The two-dimensional code images give the coordinates of a handwriting trajectory when the user performs writing with the digital pen 2 on the medium 11 having the images formed thereon. Such a print instruction for printing an image containing a two-dimensional code contains the sheet ID, the region ranges, and the type of information to be stored and the action type that serve as the information type of the individual region ranges, in addition to information included in an ordinary print instruction, and uses a form document as a document.

The sheet ID is assigned by the identifier management server 5. Once the sheet ID is assigned to the first sheet, the following sheet IDs are numbered consecutively.

Now, a process performed by the image forming apparatus 4 having received a print instruction for printing an image containing a two-dimensional code by using a form document will be described.

Figure 12:
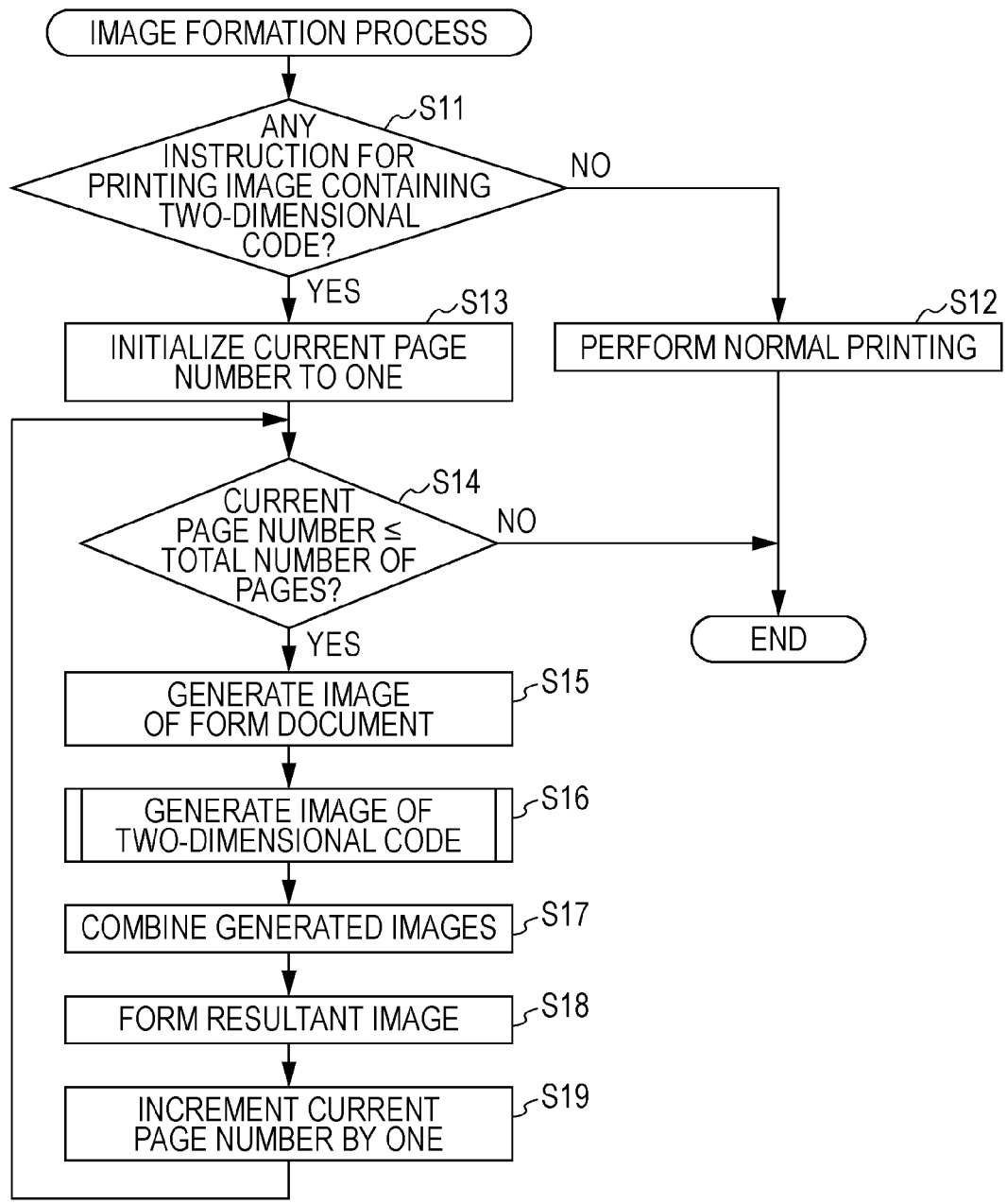
FIG. 12 is a flowchart illustrating an image formation process performed by the image forming apparatus of the image processing system according to the exemplary embodiment of the present invention.

FIG. 12 is a flowchart of the image formation process of this case. First, the image forming apparatus 4 determines whether or not the received print instruction is an instruction for printing an image containing a two-dimensional code (step S11). If the received print instruction is not an instruction for printing an image containing a two-dimensional code but is an ordinary print instruction (NO in step S11), the image forming apparatus 4 performs an ordinary printing operation (step S12). The process then ends.

If the received print instruction is an instruction for printing an image containing a two-dimensional code (YES in step S11), the image forming apparatus 4 initializes the current page number to one (step S13) and then performs processing starting from step S15 until the current page number exceeds the total number of pages of the document specified in the print instruction (step S14). Specifically, the image forming apparatus 4 generates an image of the current page of the form document specified in the print instruction (step S15). The image forming apparatus 4 then generates two-dimensional code images of the page (which will be described in detail later) (step S16), and combines the image of the form document and the two-dimensional code images (step S17). In generation of the two-dimensional code images (step S16), a two-dimensional code is generated in which the two-dimensional code images are consecutively formed in a portion of the page. The two-dimensional code images are generated by the image forming apparatus 4 in this manner but the two-dimensional code images may be generated by the host computer 3 and then transmitted to the image forming apparatus 4. The printer engine 24 forms this combined image (step S18). In this manner, an image forming unit is implemented. After the current page number is incremented by one (step S19), the process returns to step S14. If the current page number exceeds the total number of pages of the document specified in the print instruction (NO in step S14), the process ends.

Figure 13:
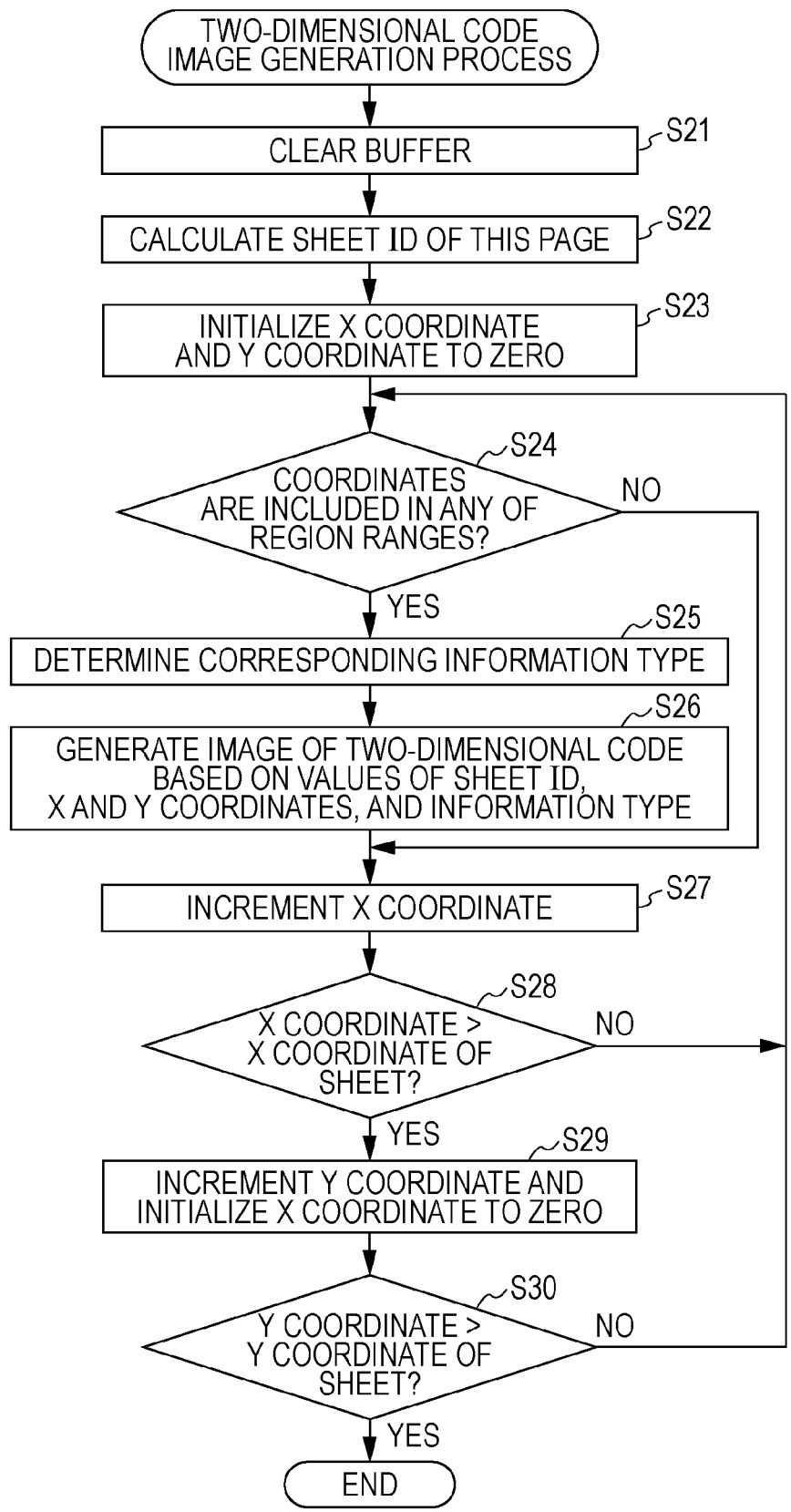
FIG. 13 is a flowchart illustrating a subroutine of step S16 of the image formation process performed by the image forming apparatus of the image processing system according to the exemplary embodiment of the present invention.

Next, the above-mentioned generation of the two-dimensional code images (step S16) will be described. FIG. 13 is a flowchart of the two-dimensional code image generation process. First, the image forming apparatus 4 clears a buffer that stores two-dimensional code images to be generated (step S21). A capacity of this buffer is set in accordance with the size of sheet to be output. The image forming apparatus 4 then calculates the sheet ID of the current page (step S22) in order to print the sheet ID on the page. Here, the sheet ID is determined by adding one, for each page, to the sheet ID used to form an image of the first page. The image forming apparatus 4 initializes the X coordinate and the Y coordinate on the sheet on which an image is to be formed to zero (step S23). The image forming apparatus 4 then determines whether or not the current coordinates are contained in any of the region ranges (step S24). The region ranges are specified in the form document described above. If the current coordinates are contained in any of the region ranges (YES in step S24), the image forming apparatus 4 determines the information type corresponding to the region range (step S25). The information type is specified for the region range in the form document described above. Subsequently, the image forming apparatus 4 generates a two-dimensional code image in the buffer based on the values of the sheet ID, the current X and Y coordinates, and the information type determined in step S25 (step S26).

After the two-dimensional code image is generated (step S26) or if the current coordinates are not contained any of the region ranges (NO in step S24), the image forming apparatus 4 adds a value equivalent to one two-dimensional code image to the current X coordinate (step S27). If the current X coordinate is not greater than the X coordinate of the sheet (NO in step S28), the process returns to step S24 and the processing described above is repeated. If the current X coordinate exceeds the X coordinate of the sheet (YES in step S28), the image forming apparatus 4 adds a value equivalent to one two-dimensional code image to the current Y coordinate and initializes the current X coordinate to zero (step S29). If the current Y coordinate is not greater than the Y coordinate of the sheet (NO in step S30), the process returns to step S24 and the processing described above is repeated. If the current Y coordinate exceeds the Y coordinate of the sheet (YES in step S30), the process ends.

FIG. 14 specifically describes the two-dimensional image generation process. In FIG. 14, the page number of an image to be formed, the region range, and the information type contained in a print instruction for printing an image containing a two-dimensional code are associated with each other. "Rectangle starting coordinates" represent X and Y coordinates of the upper left corner of the rectangular region range. "Rectangle ending coordinates" represent X and Y coordinates of the lower right corner of the rectangular region range. In this example, when the current page number is one, the current X coordinate is zero, and the current Y coordinate is zero, the represented position is not contained in any of the region ranges. Thus, the two-dimensional code image is not generated at these coordinates. On the other hand, when the current page number is one, the current X coordinate is 1000, and the current Y coordinate is 1000, the represented position is contained in the region range listed at the top of the example illustrated in FIG. 14. Thus, at these coordinates, the coordinate information and the time information obtained by the clock 46 are set as the type of information to be stored, authentication is set as the action type, and the transfer destination 1 is set as the transfer destination.

A structure of a two-dimensional code image generated through the two-dimensional code image generation process will be described next. FIG. 15 illustrates a structure of a two-dimensional code image. This two-dimensional code image 101 is constituted by 5×5 blocks 102. Each block 102 is constituted by 3×3 toner images 103. Information is represented based on ON (with an image)/OFF (without an image) of these 3×3 toner images 103. In each block 102, the number of ON toner images 103 is three. One block 102 located at the upper left corner among the 5×5 blocks 102 in the two-dimensional code image 101 is called a pattern identifying block 104. The pattern identifying block 104 represents the position of the upper left corner of one two-dimensional code image 101. That is, the pattern identifying block 104 serves as a reference position within the two-dimensional code image 101. Four blocks 102 located on the right of the pattern identifying block 104 are called X coordinate blocks 105. Each X coordinate block 105 represents coordinate information of the X coordinate. Four blocks 102 located under the pattern identifying block 104 are called Y coordinate blocks 106. Each Y coordinate block 106 represents coordinate information of the Y coordinate. The other blocks 102 are called information type blocks 107. The information type blocks 107 represent information, such as the sheet ID and the information type, namely, the type of information to be stored, the action type, and the transfer destination.

FIG. 16 illustrates a structure of data encoded in the two-dimensional code image 101. In the two-dimensional code image 101, information is recorded in the information type blocks 107 so that 50 bits are used for the sheet ID and 11 bits are used for extension. The 11 bits for extension are distributed in the following way in this example. Specifically, regarding the type of information to be stored, one bit is assigned to indicate whether or not to store the "writing pressure" information acquired by the writing pressure sensor 47, one bit is assigned to indicate whether or not to store the "time" information acquired by the clock 46, one bit is assigned to indicate whether or not to store the "coordinates" acquired from the X coordinate blocks 105 and the Y coordinate blocks 106, and one bit is assigned to indicate whether or not to store the "pen ID" for identifying the digital pen 2. Also, three bits are assigned to the "action type" and two bits are assigned to the "transfer destination". In addition, two data bits are reserved. Note that one bit may be assigned from among the reserved data bits to indicate whether or not to store the "tilt" information of the digital pen 2 acquired by the tilt sensor 48.

Figure 17:
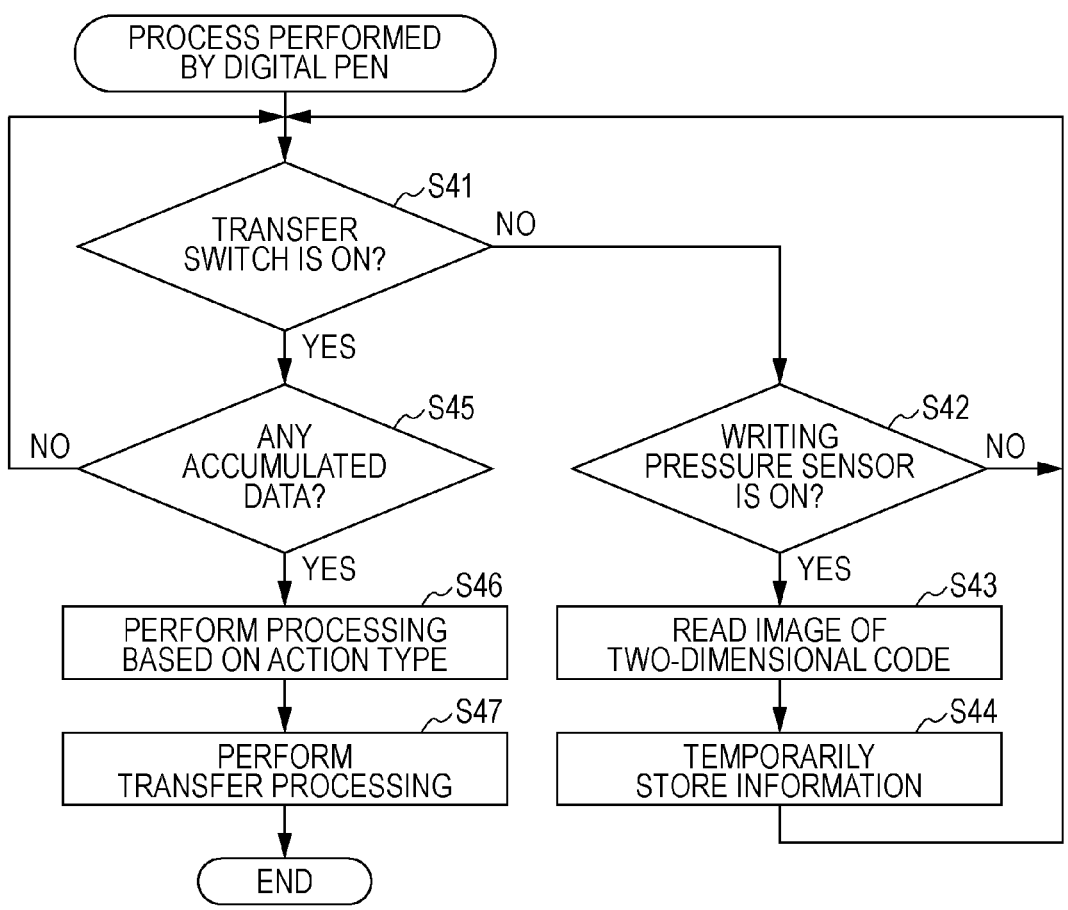
FIG. 17 is a flowchart of a digital pen process performed by the digital pen of the image processing system according to the exemplary embodiment of the present invention.

A process performed by the digital pen 2 will be described next. FIG. 17 is a flowchart illustrating a digital pen process performed by the digital pen 2. The digital pen 2 first determines whether or not the transfer switch 49 is on (step S41). If the transfer switch 49 is off (NO in step S41), the digital pen 2 determines whether or not the writing pressure sensor 47 is on (step S42). If the transfer switch 49 is off (NO in step S41) and the writing pressure sensor 47 is on (YES in step S42), this state indicates that the user is performing a writing operation using the digital pen 2 on the medium 11 having two-dimensional code images formed thereon in accordance with a print instruction. At this time, the digital pen 2 reads the two-dimensional code images with the scanner 45 included therein (step S43). The digital pen 2 then temporarily stores, in the RAM 43 or the nonvolatile memory 44, information specified by the type of information to be stored, the action type, and the transfer destination information which are encoded in the two-dimensional code images (step S44).

On the other hand, if the transfer switch 49 is on (YES in step S41), the digital pen 2 determines whether or not data of the information specified by the type of information to be stored, the action information, and the transfer destination information is accumulated in the RAM 43 or the nonvolatile memory 44 (step S45). If the data is accumulated (YES in step S45), the digital pen 2 performs processing on the information specified by the type of information to be stored, based on the action type (step S46). The digital pen 2 then transfers the processed information to the destination specified as the transfer destination (step S47).

As a result of the process described above, various kinds of information acquired by the digital pen 2, such as the "coordinates" that are the coordinate information on the medium 11, the "time" acquired by the clock 46, the "writing pressure" acquired by the writing pressure sensor 47, and the "tilt" acquired by the tilt sensor 48, are selected in accordance with the type of information to be stored and are processed in accordance with the action type, instead of being transferred to the host computer 3 or the like without being processed. The processing result is then transferred to the transfer destination, such as the host computer 3. The following describes the digital pen process by using specific examples.

FIGS. 18 and 19 illustrate an example form document. FIG. 20 illustrates a specific example of the region type, the information type, and the region range set for this example form document. In a form document 201, region ranges 202, 203, 204, and 205 are associated with the region types "character" at the top of FIG. 20, "check (1)", "check (2)", and "character" at the bottom of FIG. 20, respectively. Also the region ranges 202, 203, 204, and 205 are associated with the respective information types and the respective region ranges. In this example, because OCR is set as the action type for the region ranges 202 and 205, the digital pen 2 performs character recognition processing on handwriting trajectories represented by consecutive pieces of coordinate information obtained in the region ranges 202 and 205. The digital pen 2 then transfers text data resulting from this character recognition processing to the specified transfer destination, i.e., the transfer destination 2. Consequently, information of the handwriting trajectory represented by consecutive "coordinates" is no longer transferred.

Another specific example will be described next. FIGS. 21 and 22 illustrate an example form document. FIG. 23 illustrates a specific example of the region type, the information type, and the region range set for this example form document. In a form document 221, region ranges 211 to 218 and 219 are associated with the region types "check (1)" to "check (8)" and "character" of FIG. 23, respectively. Also, the region ranges 211 to 218 and 219 are associated with the respective information types and the respective region ranges.

In this example, "authentication" is set as the action type for the region range 219. Also, for the region range 219, the "coordinates" and the "writing pressure" are stored based on the type of information to be stored. When the action type is "authentication", the digital pen 2 authenticates a handwriting trajectory of a person who has written the signature in the region range 219, by using the information of the handwriting trajectory represented by consecutive "coordinates" and the "writing pressure" information obtained in the region range 219. To perform this authentication, the ROM 42 of the digital pen 2 stores, as fixed data, information regarding the coordinates and the writing pressure of writing trajectories of persons to be authenticated. The digital pen 2 verifies the information regarding the "coordinates" and the "writing pressure" stored for the region range 219 based on the type of information to be stored with this fixed data to perform authentication. Because the digital pen 2 performs the authentication in this case, information indicating whether or not the authentication is successful is transferred to the transfer destination 2 specified by the "transfer destination". Consequently, the information regarding the "coordinates" and the "writing pressure" that is stored for the region range 219 and is acquired from the writing operation performed by the user using the digital pen 2 is no longer transferred to the outside of the digital pen 2.

Now, another specific example will be described. In this example, instead of the example illustrated in FIG. 23, an example illustrated in FIG. 24 is used as a specific example of the region type, the information type, and the region range set for the example form document 221 illustrated in FIGS. 21 and 22. In the example illustrated in FIG. 24, the stroke information 4 that is the above-described processed/set information is set as the type of information to be stored for the region range 219. As described before, the stroke information 4 specifies pieces of information regarding the "coordinates", the "writing pressure", and the "tilt". Thus, pieces of information regarding the "coordinates", the "writing pressure", and the "tilt" are stored in the RAM 43 or the nonvolatile memory 44. Based on these pieces of information, processing of "authentication" specified by the action type is performed and the result is transferred to the "transfer destination 2" specified by the transfer destination.

Figure 26:
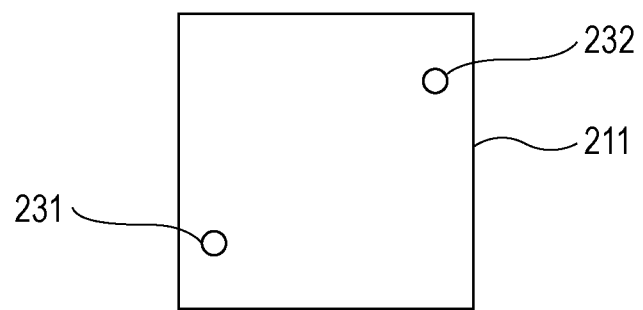
FIG. 26 describes the other specific example of the digital pen process performed by the digital pen of the image processing system according to the exemplary embodiment of the present invention.
Figure 27:
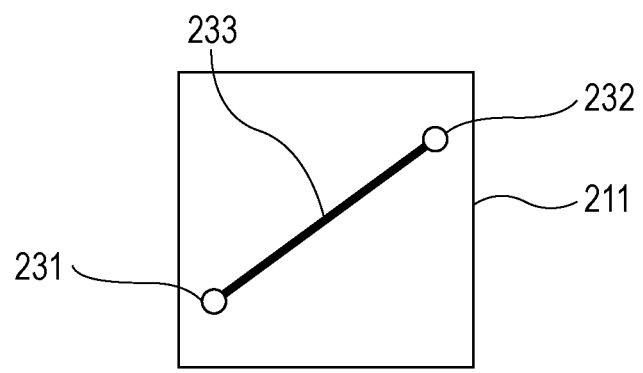
FIG. 27 describes the other specific example of the digital pen process performed by the digital pen of the image processing system according to the exemplary embodiment of the present invention.

Still another example will be described. In this example, instead of the example illustrated in FIG. 23, an example illustrated in FIG. 25 is used as a specific example of the region type, the information type, and the region range set for the example form document 221 illustrated in FIGS. 21 and 22. In the example illustrated in FIG. 25, the stroke information 1 that is the above-described processed/set information is set as the type of information to be stored for the region ranges 211 to 218. As described before, the stroke information 1 specifies pieces of information regarding the "coordinates" at the starting point and the ending point of a handwriting trajectory. Thus, pieces of information regarding these "coordinates" are stored in the RAM 43 or the nonvolatile memory 44. Based on these pieces of information, processing of "default" specified by the action type (as described before, "default" indicates that no processing is to be performed) is performed and the result is transferred to the "transfer destination 3" specified by the transfer destination. The region type of the region ranges 211 to 218 is "check" and the form document 221 has images of checkboxes. Here, it does not matter whether or not a line written in the checkbox has an upsweep and it is sufficient if it is clear that a line is drawn in the checkbox. Thus, pieces of information regarding the "coordinates" of the starting point and the ending point of the handwriting trajectory alone are transferred and pieces of information regarding other "coordinates" that constitute the handwriting trajectory are not transferred. Because the transfer destination of these pieces of information forms a line that connects the "coordinates" of the starting point and the "coordinates" of the ending point of the handwriting trajectory as a reproduced image, the upsweep of the handwritten check mark is lost. However, this does not matter because it is sufficient if it is clear that a line is drawn. FIG. 26 illustrates a starting point 231 and an ending point 232 of a handwriting trajectory written in a checkbox of the region range 211 in this case. FIG. 27 illustrates a line 233 that connects the starting point 231 and the ending point 232 in the checkbox of the region range 211. An upsweep of the check mark written in the checkbox of the region range 211 in FIGS. 21 and 22 is lost in FIG. 27.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading apparatus comprising:
   a writing tool body;
   a reading unit that reads a code formed on a medium;
   a processing unit that:
      acquires, from the code read by the reading unit, (i) coordinate information regarding coordinates on the medium and (ii) processing specifying information, associated with the coordinate information, which specifies processing to be performed on read information, the read information being information read by the reading apparatus and including at least some of the coordinate information acquired by the processing unit, and performs processing specified by the processing specifying information at the at least some of the coordinate information included in the read information and associated with the processing specifying information; and a transfer unit that transfers a processing result obtained by the processing unit to a transfer destination.

2. The reading apparatus according to claim 1, wherein the processing unit performs, as the processing, character recognition on a locus of coordinates on the medium represented by the coordinate information, and wherein the transfer unit transfers one or more characters obtained from the character recognition to the transfer destination.

3. The reading apparatus according to claim 1, wherein the processing unit performs, as the processing, authentication by comparing a locus of coordinates on the medium represented by the coordinate information with reference information, and wherein the transfer unit transfers a result indicating whether or not the authentication is successful to the transfer destination.

4. The reading apparatus according to claim 1, wherein the read information includes a plurality of kinds of information;

wherein the processing unit acquires, from the code read by the reading unit from the medium, selection specifying information which specifies one or more kinds of information to be selected from among the plurality of kinds of information, and selects the one or more kinds of information in accordance with the selection specifying information, and wherein the transfer unit transfers the selected one or more kinds of information to the transfer destination.

5. The reading apparatus according to claim 1, wherein the transfer unit acquires, from the code read by the reading unit from the medium, transfer destination specifying information which specifies the transfer destination, and transfers the processing result to the transfer destination specified by the transfer destination specifying information.

6. A non-transitory computer readable medium storing a program causing a computer to execute a process for image processing, the process comprising:

acquiring, from a code read from a medium, (i) coordinate information regarding coordinates on the medium and (ii) processing specifying information, associated with the coordinate information, which specifies processing to be performed on read information, the read information being information read by a computer and including at least some of the acquired coordinate information;

performing processing specified by the processing specifying information at the at least some of the coordinate information included in the read information and associated with the processing specifying information; and transferring a processing result obtained in response to the processing to a transfer destination.

7. An image processing method comprising:

reading a code formed on a medium;

acquiring, from the read code, (i) coordinate information regarding coordinates on the medium and (ii) processing specifying information, associated with the coordinate information, which specifies processing to be performed on read information, the read information being information read by a processor and including at least some of the acquired coordinate information;

performing processing specified by the processing specifying information at the at least some of the coordinate information included in the read information and associated with the processing specifying information; and transferring a processing result obtained in response to the processing to a transfer destination.

\* \* \* \* \*